US012808535B2

(12) United States Patent
Dauskardt

(10) Patent No.: US 12,808,535 B2
(45) Date of Patent: Nov. 24, 2026

(54) COMBUSTION DEVICE

(71) Applicant: Nils Ole Dauskardt, Colnrade (DE)

(72) Inventor: Nils Ole Dauskardt, Colnrade (DE)

( * ) Notice: Subject to any disclaimer, the term of this patent is extended or adjusted under 35 U.S.C. 154(b) by 993 days.

(21) Appl. No.: 17/799,512

(22) PCT Filed: Feb. 15, 2021

(86) PCT No.: PCT/EP2021/053629

§ 371 (c)(1), (2) Date: Aug. 12, 2022

(87) PCT Pub. No.: WO2021/160880

PCT Pub. Date: Aug. 19, 2021

(65) Prior Publication Data

US 2023/0349547 A1 Nov. 2, 2023

(30) Foreign Application Priority Data

Feb. 13, 2020 (DE) ......................... 102020103807.0

(51) Int. Cl.
*F23B 20/00* (2006.01)
*A47J 37/07* (2006.01)
(Continued)

(52) U.S. Cl.
CPC ............. *F23B 20/00* (2013.01); *A47J 37/079* (2013.01); *C10B 49/02* (2013.01); *F23B 10/00* (2013.01);
(Continued)

(58) Field of Classification Search
CPC .......... F23B 20/00; F23B 10/00; F23B 50/12; F23B 60/00; F23B 2700/037; F23B 60/02; C10B 49/02
See application file for complete search history.

(56) References Cited

U.S. PATENT DOCUMENTS 1,959,473 A * 5/1934 Heron ..................... C10L 11/04 126/25 B
3,884,214 A * 5/1975 Duncan ................. A47J 37/079 D23/386
(Continued)

FOREIGN PATENT DOCUMENTS

CA 2556953 A1 2/2008
DE 202014102374 U1 6/2014
(Continued)

OTHER PUBLICATIONS

Office Action for German Application No. 102020103807.0, dated Dec. 15, 2020. 5 pages.
(Continued)

*Primary Examiner* — David J Laux
(74) *Attorney, Agent, or Firm* — Lerner David LLP

(57) ABSTRACT

The invention relates to a combustion device for burning fuel such as wood, wood chips, wood pellets, or the like, wherein the combustion device comprises a first chamber and a second chamber, wherein the second chamber is arranged underneath the first chamber and the first chamber receives the fuel, wherein the first chamber comprises, at the bottom, an intermediate layer of combustible material which holds the fuel in the first chamber as long as the intermediate layer is not damaged or destroyed by combustion and such that, following damage to or destruction of the intermediate layer, fuel located in the first chamber falls into the second chamber, wherein, during the combustion process in the first chamber, substantially gas combustion is caused and, after the fuel has been conveyed into the second chamber, coal burning preferably occurs, or the fuel may be removed from the second chamber through an opening.

20 Claims, 9 Drawing Sheets

(51) Int. Cl.
*C10B 49/02* (2006.01)
*F23B 10/00* (2011.01)
*F23B 50/12* (2006.01)
*F23B 60/00* (2006.01)

(52) U.S. Cl.
CPC .............. *F23B 50/12* (2013.01); *F23B 60/00* (2013.01); *F23B 2700/037* (2013.01)

(56) References Cited

U.S. PATENT DOCUMENTS

| | | | | |
|---|---|---|---|---|
| 3,934,520 | A * | 1/1976 | Brennan | A47J 37/079<br>D23/386 |
| 4,460,377 | A * | 7/1984 | Kalil | C10L 11/04<br>44/520 |
| 6,009,867 | A * | 1/2000 | Walton | F23Q 13/04<br>126/25 B |
| 6,840,764 | B1 * | 1/2005 | Kennedy | C10B 9/00<br>44/620 |
| 7,823,576 | B2 * | 11/2010 | Timmons | C10L 5/368<br>126/25 B |
| 10,327,590 | B1 * | 6/2019 | Moore | A47J 37/079 |
| 11,571,089 | B2 * | 2/2023 | Stafford, IV | C10L 5/368 |
| 2008/0092437 | A1 * | 4/2008 | Helms | C10L 5/368<br>44/520 |
| 2008/0230044 | A1 * | 9/2008 | Warner | F24B 1/022<br>126/25 B |
| 2009/0095276 | A1 * | 4/2009 | Kaye | A47J 37/079<br>126/144 |
| 2009/0205627 | A1 * | 8/2009 | Timmons | C10L 11/04<br>126/25 B |
| 2011/0214663 | A1 * | 9/2011 | Cox | C10L 5/146<br>264/319 |
| 2013/0042852 | A1 * | 2/2013 | Cottrell | F23Q 13/04<br>126/25 B |

FOREIGN PATENT DOCUMENTS

| | | | |
|---|---|---|---|
| DE | 202017103482 | U1 | 7/2017 |
| EP | 2821698 | A1 | 1/2015 |
| GB | 2503647 | A | 1/2014 |
| WO | 2011109816 | A2 | 9/2011 |

OTHER PUBLICATIONS

International Search Report for PCT/EP2021/053629 dated Jun. 28, 2021. 6 pgs.

* cited by examiner

COMBUSTION DEVICE

CROSS REFERENCE TO RELATED APPLICATIONS

The present application is a national phase entry under 35 U.S.C. § 371 of International Application No. PCT/EP2021/053629, filed Feb. 15, 2021, which claims priority from German Application No. 102020103807.0, filed Feb. 13, 2020, all of which are incorporated herein by reference.

CROSS REFERENCE TO RELATED APPLICATIONS

The present application is a national phase entry under 35 U.S.C. § 371 of International Application No. PCT/EP2021/053629, filed Feb. 15, 2021, which claims priority from German Application No. 102020103807.0, filed Feb. 13, 2020, all of which are incorporated herein by reference.

The invention relates to a combustion device which is used to burn a particular fuel, the first phase of combustion being substantially gas combustion, at the end of which the remaining material is substantially charcoal, and this charcoal is then either supplied for some other use, for example use in a charcoal grill for preparing food, or the charcoal obtained is subjected to further treatment in such a way that it cools down and is later supplied for some other use, be it as grill charcoal or as garden fertiliser, or the like.

Whenever the expression "charcoal" is mentioned in the present application, what is meant is the product which is also referred to often as vegetable coal or biochar, i.e. coal obtained by thermal conversion of plants, in particular of wooden constituents thereof.

Combustion devices of many different kinds have been known for a long time. Burning wood has long belonged to the prior art, starting with a camp fire and proceeding to various kinds of kilns, furnaces, stoves, fireplaces, etc. The same is also true of processed wood, such as wood chips or wood pellets.

Wood chips are obtained by shredding available wood and thus reducing it to a predetermined size. Wood pellets are generally produced by compressing kindling or sawdust to form a pellet with a particular size and shape.

The advantage of wood chips, wood pellets or wood products processed in such ways is that they are still substantially free-flowing and can thus be fed to the combustion chamber in a particular dosage by means of different drives, such as worm drives, conveyor belts, etc.

Another advantage of wood chips, wood pellets and the like is that they are dried industrially to a predetermined moisture content, for example 15% or less, which cannot be done in such a short time or so uniformly as in the case of logs, whole tree trunks, or the like.

Whereas timber logs, or wood, lignite, anthracite coal or peat, etc. which has been pressed to form briquettes are generally burned in stoves or in fireplaces, wood chips and/or pellets are generally used where the aim is to generate heat, and less to produce a visually attractive flame, as is the case with a fireplace (with or without a protective window) for providing a room with a pleasant ambience.

The aim of the invention is to form a visually very attractive flame in a combustion device, i.e. a flame which is clearly visible and which remains visible for a particular period of time and which hardly changes its appearance. The object of the invention is also to allow the user of the combustion device to operate the combustion device with as little effort as possible, in particular with as little dirt and dust as possible, and also to enable the user to put the combustion device into operation very quickly and safely.

In the case of fireplaces, stoves or camp fires, in particular, the recurrent problem for inexperienced users is to get the desired fire burning in the first place. This may be due to the moisture content of the wood, or also to the desired fire starter not being available in sufficient amounts, or to the user simply lacking the know-how needed to start a log fire.

A fire starter is basically any firelighter, such as a Fidibus stick, be it biologically based or chemically based, i.e. a firelighter that starts to burn immediately after contact with a flame (e.g. a match, a pocket lighter, etc.), so as to also ignite the surrounding fuel, such as wood. A typical fire starter nowadays is above all a wood shavings firelighter, i.e. wood shavings which have been impregnated on the outside with wax (especially paraffin wax) and where the wood shavings have been shaped into a predetermined body, for example a cylinder, a ball, or the like. To ignite a fire, this fire starter is usually laid near the wood to be burned in the stove, fireplace, or the like.

However, basically any firelighter can be used, be it biologically based or chemically based, i.e. a firelighter that starts to burn immediately after contact with a flame, so as to also ignite the surrounding fuel.

The object of the invention is achieved by a combustion device having the features of claim 1. Advantageous developments of the invention are described in the dependent claims.

An essential feature of the combustion device according to the invention is that it ultimately has a structure comprising a first chamber—a chamber for gas combustion, for example—and a second chamber, for example for burning coal, wherein an intermediate layer (intermediate floor) can be introduced between the first and the second chamber and this intermediate layer consists of combustible material. The function of the intermediate layer is firstly to separate the first chamber from the second chamber, above all to support the fuel stored in the first chamber, even when the fuel has already started to burn.

The material of the intermediate layer is provided in the form of a combustible material such as wood, cardboard, fibreboard, plywood or the like (a combination of different combustible materials is also conceivable). This intermediate layer is so designed that not only does fuel lie on it, but also that whenever the fuel burns down from top to bottom, the intermediate layer also burns and that all the fuel lying on the intermediate layer (regardless of how far the fuel has already burned up) falls downwards due to the force of gravity into the second chamber, along with the intermediate layer (or as much of it as possible), whenever the intermediate layer loses its stability or structure due to its ongoing combustion.

Since the fuel, up to this point, has burned down from top to bottom, as already mentioned, and the gases in the fuel have largely been expelled due to gas combustion, what falls down as fuel into the second chamber consists substantially, i.e. to more than 80 to 90%, only of material that is generally referred to as charcoal.

If the second chamber has a closed shaft that can be opened, the coal (and ash) falling into the second chamber can be removed there, and the charcoal that is still glowing can be supplied immediately to a charcoal grill, for example, which means that the charcoal produced by the combustion device is immediately available for food preparation on a charcoal grill without the user himself having to purchase charcoal. In that respect, the invention also enables the user to produce his own barbecue charcoal, also when he needs it for a barbecue.

If the user does not immediately process the fuel that has fallen into the second chamber, i.e. the coal, it can cool down there and be provided later on as barbecue charcoal, or also for other purposes, for example for fertilizing purposes in the garden, or the like.

It has been found in several tests, however, that the invention results in a flame of splendid appearance, because due to the fuel having predefined properties (particle/grain size, volume, packing density, moisture content, dryness), a reliably repeatable result of burning can be achieved that is characterised by a flame of attractive appearance, and with a duration of combustion that can likewise be determined in advance with relative (temporal) precision.

As soon as the fuel has burned down to the intermediate layer and the latter has been destroyed, the fuel falls out of the first chamber into the second chamber, and the first chamber can then be refilled immediately.

The combustion chamber can basically be filled by firstly placing the intermediate layer (e.g. a combustible shelf with specific dimensions) at the bottom of the first chamber, where it is held in place by a suitable support—this can take the form of simple projections (screws, pins, edges, etc.) protruding into the interior of the chamber—, and the fuel is then tipped onto the intermediate layer until a predetermined desired filling level of the first combustion chamber is reached.

After that, a lighter/firelighter is preferably placed on top of the fuel, as described above, and then ignited, thus starting the entire combustion process for the fuel in the first chamber, until the flame reaches the intermediate layer and destroys it, after which the fuel in the first chamber, particularly charcoal as mentioned, falls into the second chamber.

According to the invention, a container whose dimensions are substantially adapted to the dimensions of the first chamber in respect of height, width and also length is provided for particularly simple handling, also for particularly clean handling, in particular, which does not produce dust and dirt when the first combustion chamber is being filled with fuel. This container is then filled beforehand with the fuel and can be easily inserted into the first chamber from above.

It is then possible for the intermediate floor to be placed in the first chamber in advance, where it is held in place by the support in the chambers, in order to place the container on top of it, or the intermediate floor alternatively forms the floor of the container or is placed inside it, so that when the fuel is inserted it is placed in the first chamber along with the intermediate floor and the container.

The user can then place a firelighter on top of the fuel and light it.

Alternatively, however, it is also possible for the container to be already provided with this firelighter at the top, and even for the container to be closed at the top after it has been filled with the fuel and the firelighter has been placed on top, so that the container can be inserted completely cleanly into the first chamber without the risk of dust, dirt, fine particles of the fuel, etc. still being spillable from the container.

When the container according to the invention has been filled with fuel, provided with a firelighter placed on top, and then closed, fast ignition is still possible, in a "plug and play" manner, because everything needed for combustion to start has already been set up.

The container preferably has a carrying aid (of combustible material) on its top side, for example in the form of a handle or the like which consists of the same material as the container, or which simultaneously forms a kind of match cord, so that when this handle is lit with the pocket lighter it burns downwards, where it meets the firelighter lying underneath the handle, thus allowing the firelighter and/or the fuel to be easily ignited.

Due to the type of filling, in particular the volume, dryness and size of the fuel—there are wood chips/pellets in different size categories —, it is thus possible for the burn-off (duration, form) to be determined very precisely and thus for the combustion duration of the gas combustion phase to be determined in advance.

The attractive flame appearance, mentioned above, is produced in this gas combustion phase—in the first chamber—whereby if the fuel has been reasonably dried (e.g. to less than 15%), hardly any smoke is produced, and if air can initially enter the first chamber only from above, the respective flame will also be produced there only, i.e. the visible flame develops substantially above the edge of the first chamber even when the fuel has already burned down relatively far towards the intermediate layer (intermediate floor).

By forming ventilation openings (oxygen supply) in the upper or middle part of the first chamber, or by opening or closing such ventilation openings, it is possible for the user to exert a direct influence on the burn-off. The more air that enters the first chamber from below, for example, the faster the fuel will burn off.

As already mentioned, the intermediate layer (intermediate floor) according to the invention consists of a combustible material.

It may be a wooden board, or a plywood board/laminated wood panel, or a board made of wood fibre or paper fibre, or a board made of cardboard, paper, etc. The essential requirement to be met by the intermediate layer is that can hold (support) the fuel in the first chamber and that the intermediate layer also burns when the flame reaches it, such that the support structure provided by the intermediate layer is lost due to destruction by burning, and the fuel still located in the first chamber can fall downwards into the second chamber.

Ideally, this second chamber is arranged vertically below the first chamber, but can also be arranged slightly offset from it by laterally extending air locks.

When the coal (the fuel combusted in the first chamber) falls into the second chamber, this second chamber should be sealed as smoke-tight as possible so that the coal which is still glowing does not continue to glow, due to cooling and to the lack of oxygen supply, and can then be removed from the second chamber via an access (e.g. a door, a flap, a shaft, etc.).

As already mentioned, it is also possible that when the charcoal falls into the second chamber due to the intermediate layer burning, it can be removed directly from the second chamber via the access by means of a dustpan, etc., in order to charge a charcoal grill with it, on which meat, fish, vegetables, etc. can be grilled.

The advantage of the combustion device according to the invention is therefore that a user can produce his own fresh, still glowing barbecue charcoal in order to operate the charcoal grill with it.

If the charcoal falling into the second chamber is not to be processed immediately, it will cool down and can still be used later as barbecue charcoal—in the usual manner—or also as fertiliser or for any other uses to which charcoal can be put.

The invention shall now be described in greater detail with reference to an illustrated example, in which:

Fig. 1*a* depicts an external view of a combustion device according to aspects of the disclosure;

FIG. 1*b* depicts a partial vertical section of the combustion device according to aspects of the disclosure;

FIG. 1*c* depicts a partial vertical section of the combustion device according to aspects of the disclosure;

FIG. 1*d* depicts a partial vertical section of the combustion device according to aspects of the disclosure;

FIG. 1*e* depicts an example for inserting the intermediate layer into the first combustion chamber according to aspects of the disclosure;

FIG. 1*f* depicts another example for inserting the intermediate layer into the first combustion chamber according to aspects of the disclosure;

FIG. 1*g* depicts an example cross-sectional view of the first chamber according to aspects of the disclosure;

Figure 5A:
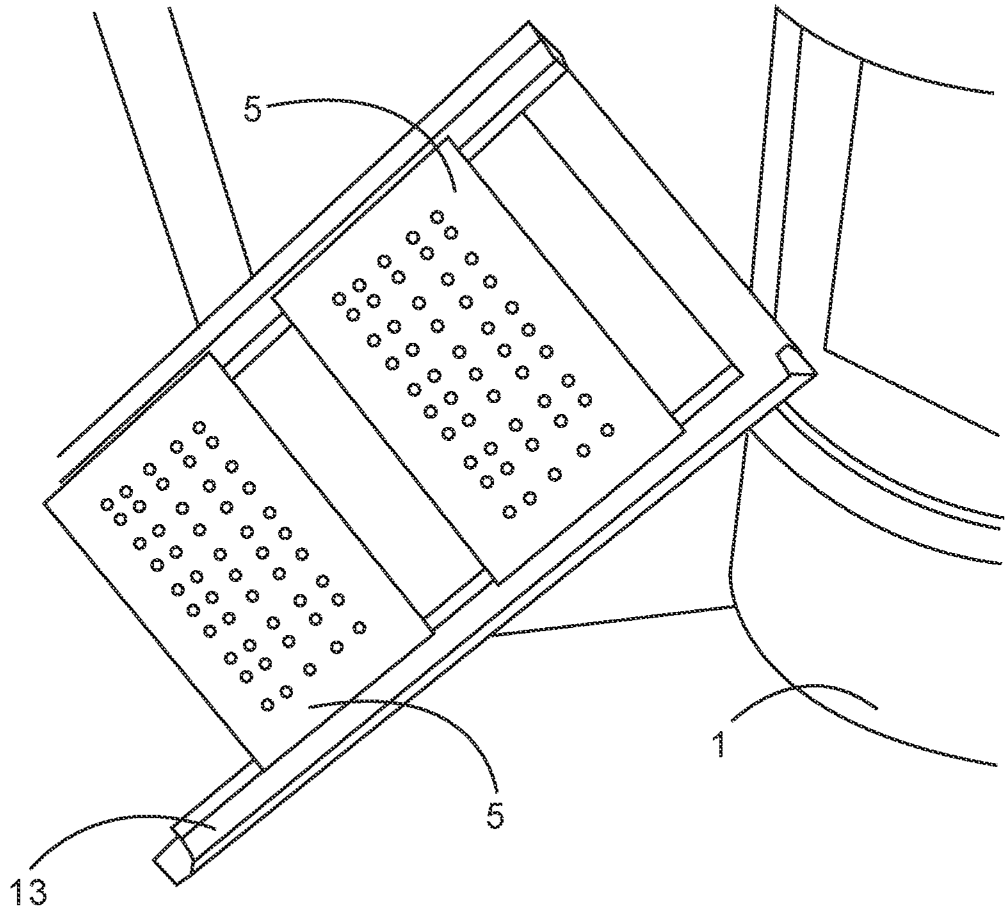
Figure 5B:
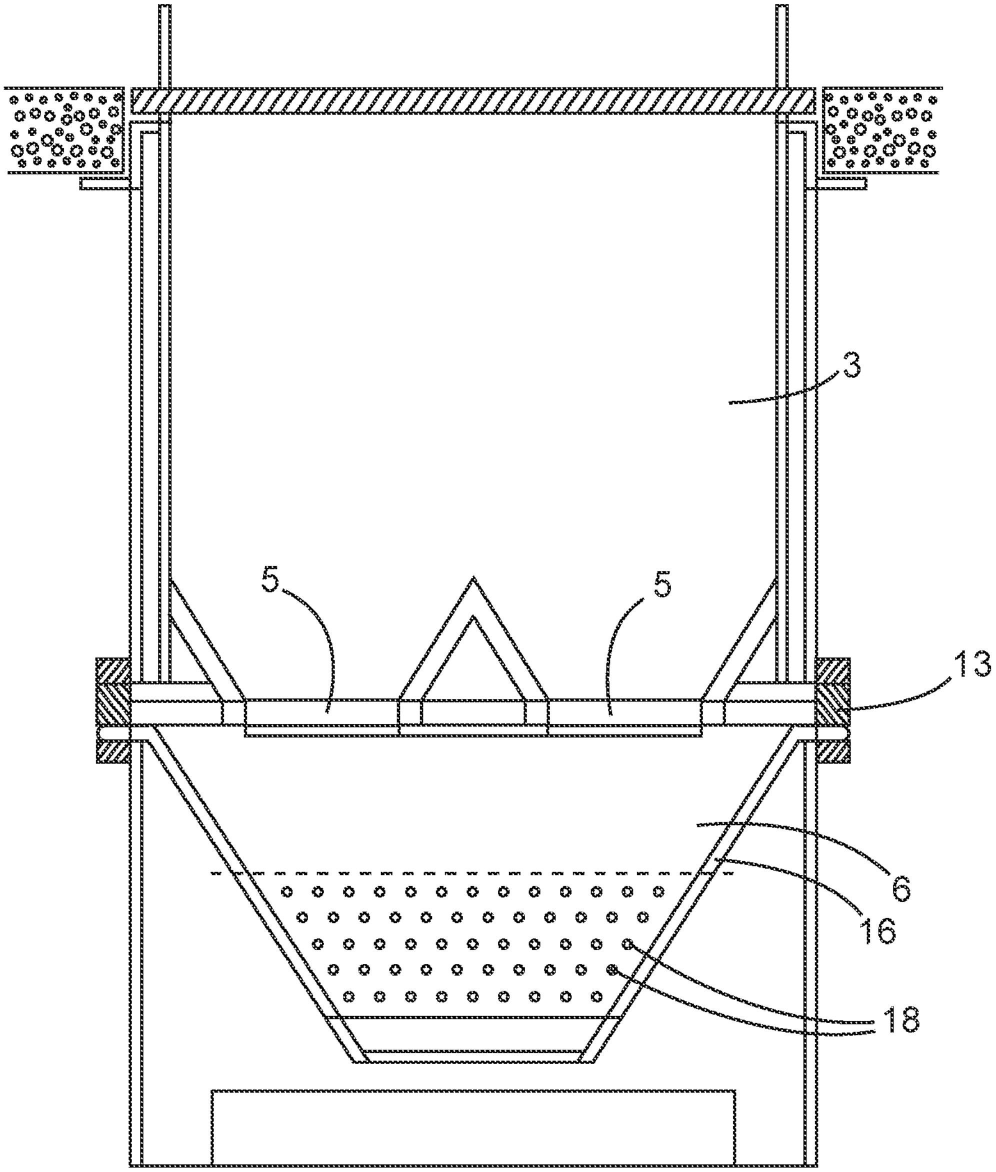
Figure 5C:
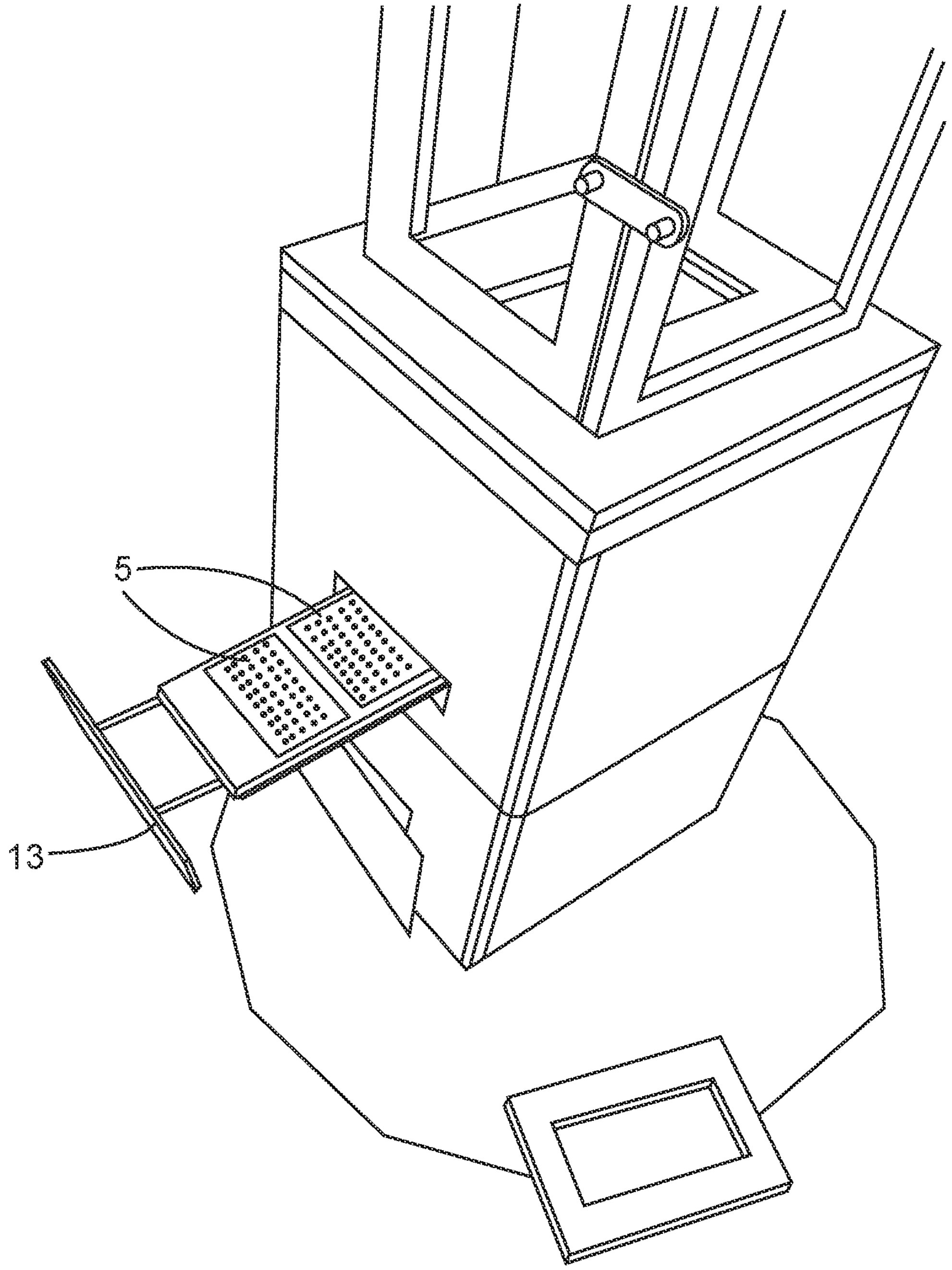
Figure 5D:
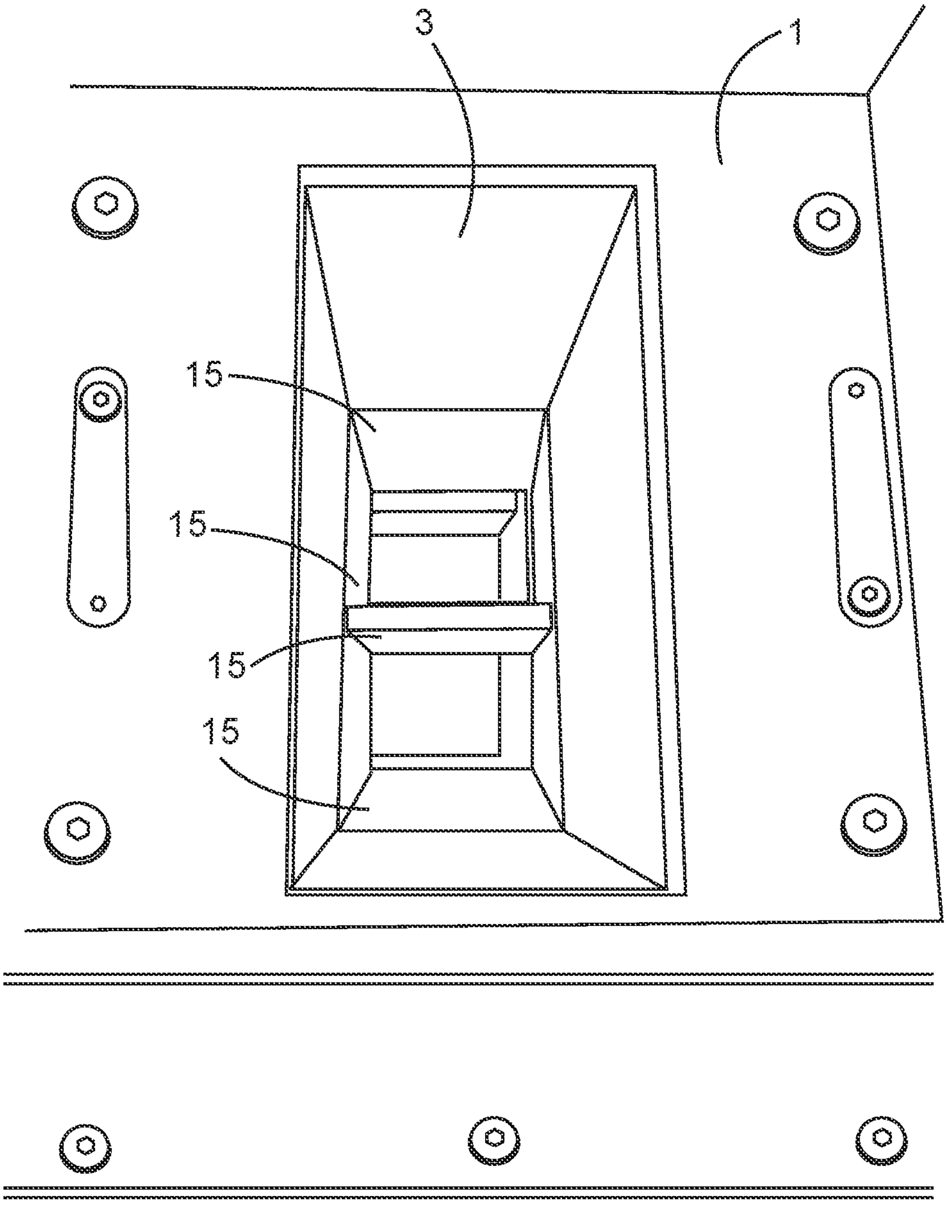
Figure 6:
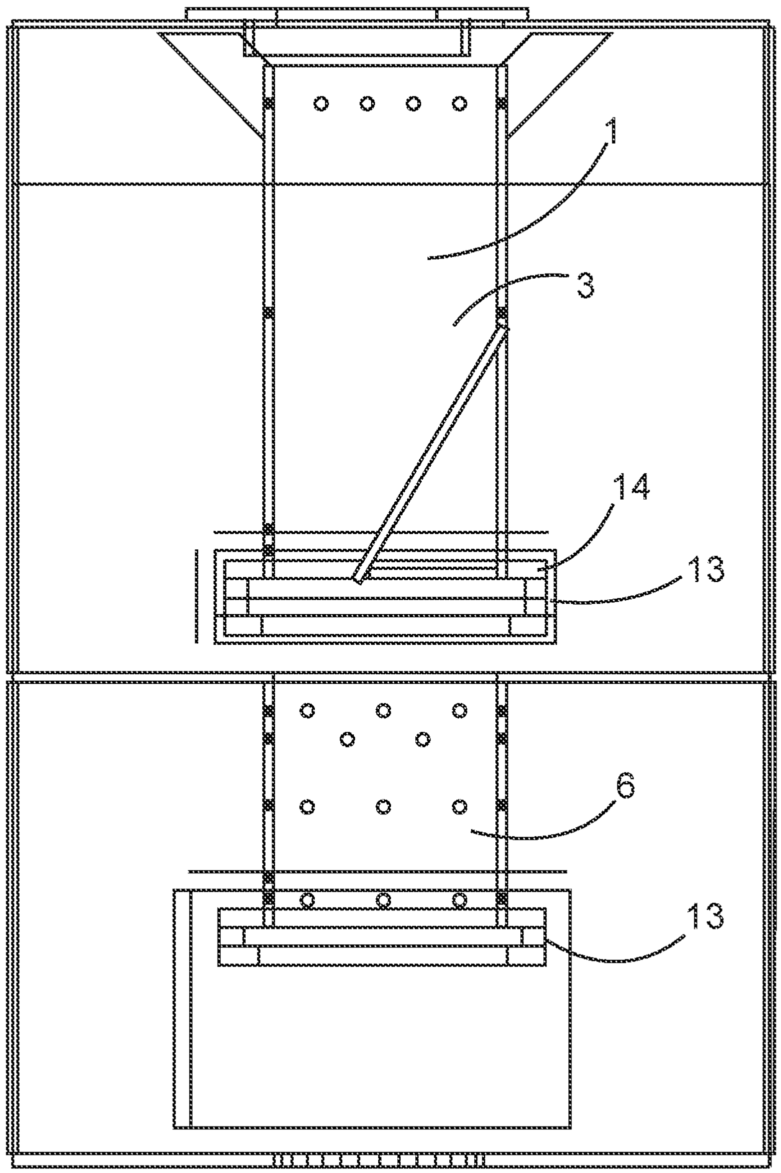
Figure 7A:
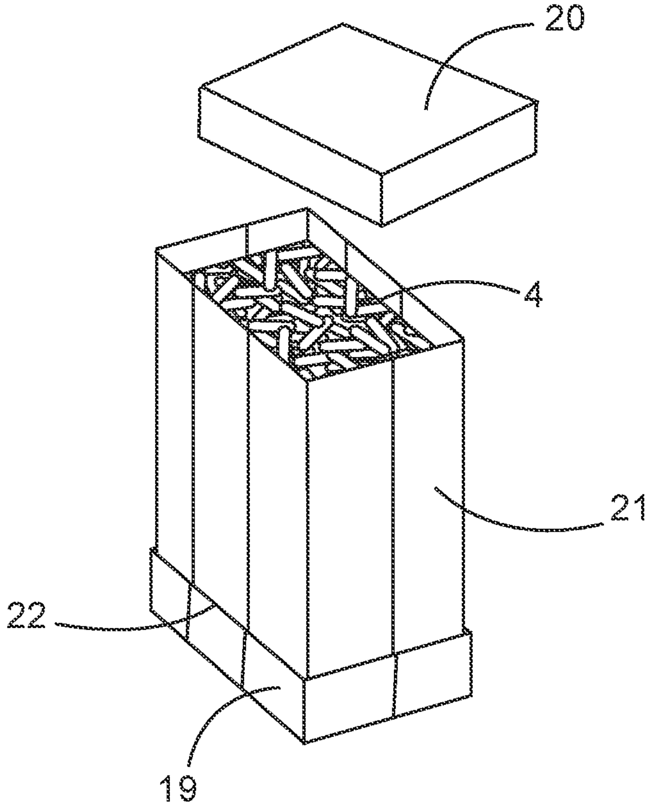
Figure 7B:
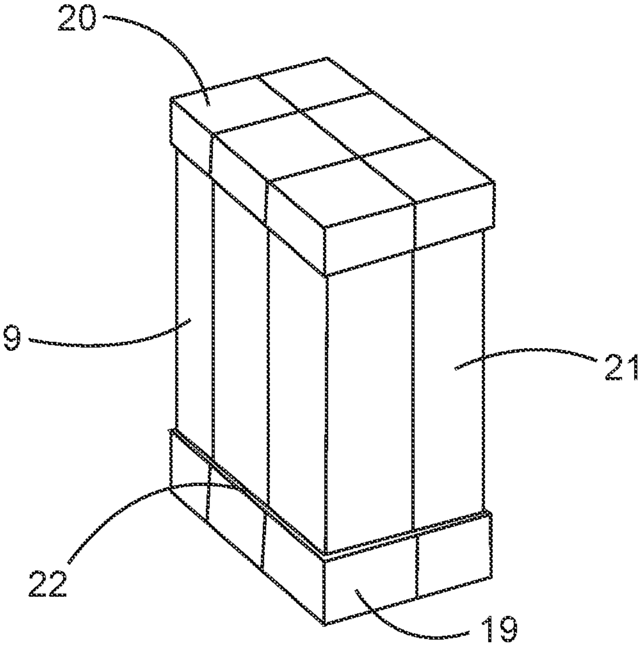

FIG. 5*a* depicts an example slide-in insert according to aspects of the disclosure;

FIG. 5*b* depicts a cross-sectional view of an example combustion device according to aspects of the disclosure;

FIG. 5*c* depicts an example combustion device with slide-in insert according to aspects of the disclosure;

FIG. 5*d* depicts a top view of the example combustion device according to aspects of the disclosure;

FIG. 6 depicts an example combustion device according to aspects of the disclosure; and FIGS. 7*a*-7*b* depict example containers according to aspects of the disclosure.

Figure 1A:
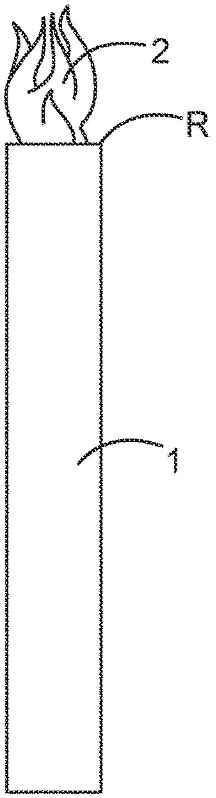

Turning now to a discussion of the figures, FIG. 1*a* shows an external view of a combustion device 1 according to the invention, in which the flames 2 emanating from the combustion device can be seen.

Figure 1B:
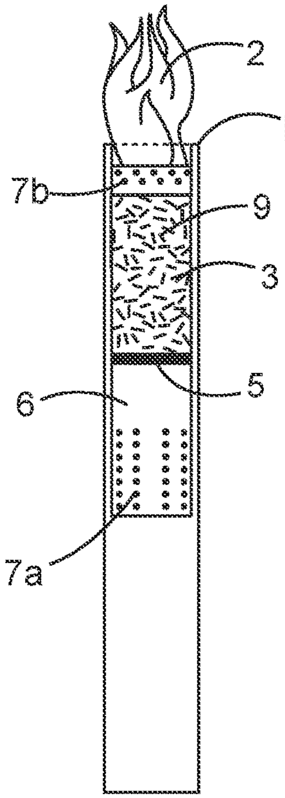

FIG. 1*b* shows a partial vertical section of the combustion device 1 according to the invention.

It can be seen that fuel 4 which burns from the top downwards is disposed in a first chamber 3, and hence that flame 2 is visible above the edges R of combustion device 1.

Chamber 3 is closed at the bottom by an intermediate layer 5. This intermediate layer may be a shelf (intermediate floor) which is held in place at the bottom end of chamber 3 by a protruding edge or projections, or by a support (not shown). Intermediate layer 5 thus forms an intermediate floor and consists of a combustible material, for example cardboard, wood, wood fibre, pressed wood, pressed wood pieces, pressboard, plywood, or the like. This intermediate layer is designed in such a way that it has a certain structural strength that remains over a given period of time, even when the fuel burns through from top to bottom as far as the intermediate layer and also sets the intermediate layer itself on fire.

The thicker the intermediate layer and the less flammable the intermediate layer, the longer it then takes to destroy the intermediate layer and its structural strength by combustion.

If the intermediate layer loses its structure due to combustion, it collapses, and the fuel which is still lying on the intermediate layer falls from the first chamber 3 into a second chamber 6.

This second chamber 6 is also used, therefore, as a collecting chamber for the burnt fuel.

If the fuel is wood chips or wood pellets, for example, most of the burnt fuel will then be charcoal, which has substantially the same properties as barbecue charcoal, i.e. it is hot, glows, but does not produce a flame, or hardly any flame.

This means that the fuel in the second chamber is still glowing and develops a high temperature, but no longer burns with a flame, because in the first phase, i.e. as long as the fuel is in the first chamber, it is mainly gas combustion that occurs, due to combustion from above.

When the fuel burnt during gas combustion falls into the second chamber, coal combustion will occur if there is a sufficient supply of oxygen, i.e. the coal will glow, give off heat and decompose to ash.

Figure 1C:
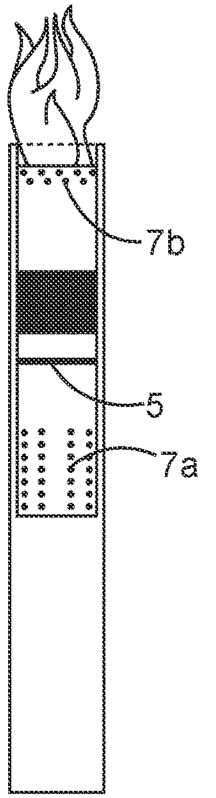
Figure 1D:
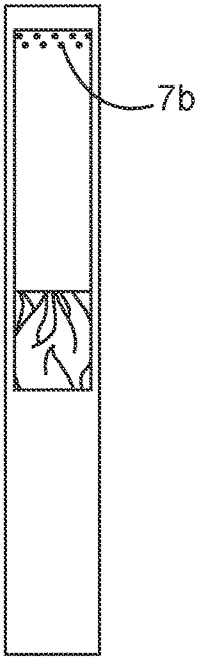

FIGS. 1*b*, 1*c* and 1*d* also show ventilation openings (orifices) 7. Such orifices can not only affect the gas combustion phase, and accelerate it, above all, but can also ensure that the coal falling into the second chamber cools down as quickly as possible so that it can be stored as barbecue charcoal.

Figure 1E:
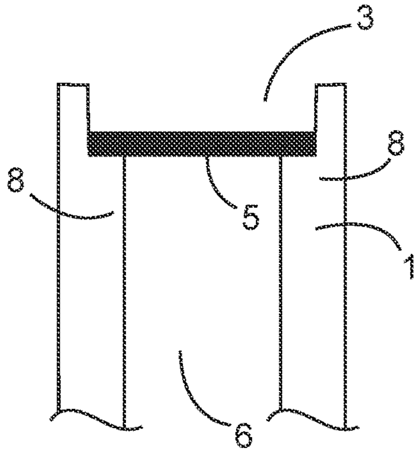
Figure 1F:
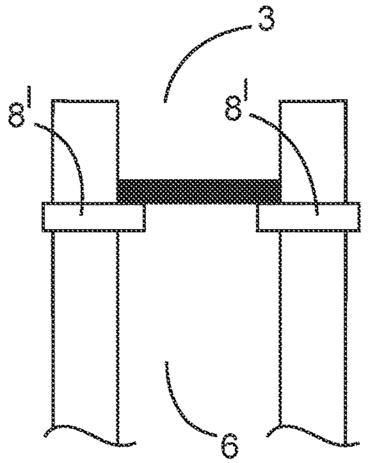

FIGS. 1*e* and 1*f* show alternative examples for inserting the intermediate layer into the first combustion chamber 3.

According to FIG. 1*e*, the combustion device has an edge at the transition between the first combustion chamber 3 and the second combustion chamber 6, such that a peripheral protrusion 8 results on which the intermediate layer 5 can be placed and held there in place.

An alternative option is shown in FIG. 1*f*, where a stop member that prevents the intermediate layer from falling into the second combustion chamber 6 is provided in the form of a protrusion in the shape of, for example, pins or bolts or screws or the like that protrude into the interior of the first combustion chamber and thus prevent the undestroyed intermediate layer from slipping/falling downwards towards the second chamber 6.

Figure 1G:
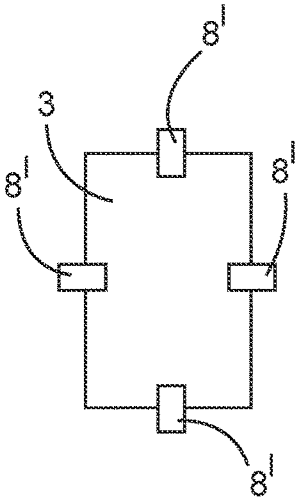

The cross-sectional area of the first chamber may be circular, oval, rectangular or square, for example. FIG. 1*g* mainly shows a rectangular cross-sectional area with protrusions 8' at the bottom end, which prevent the intermediate layer from falling through towards the second chamber.

It is self-evident that the protrusions preventing the intermediate layer from falling or slipping through are not combustible and consist of metal or the like, for example.

Figure 2:
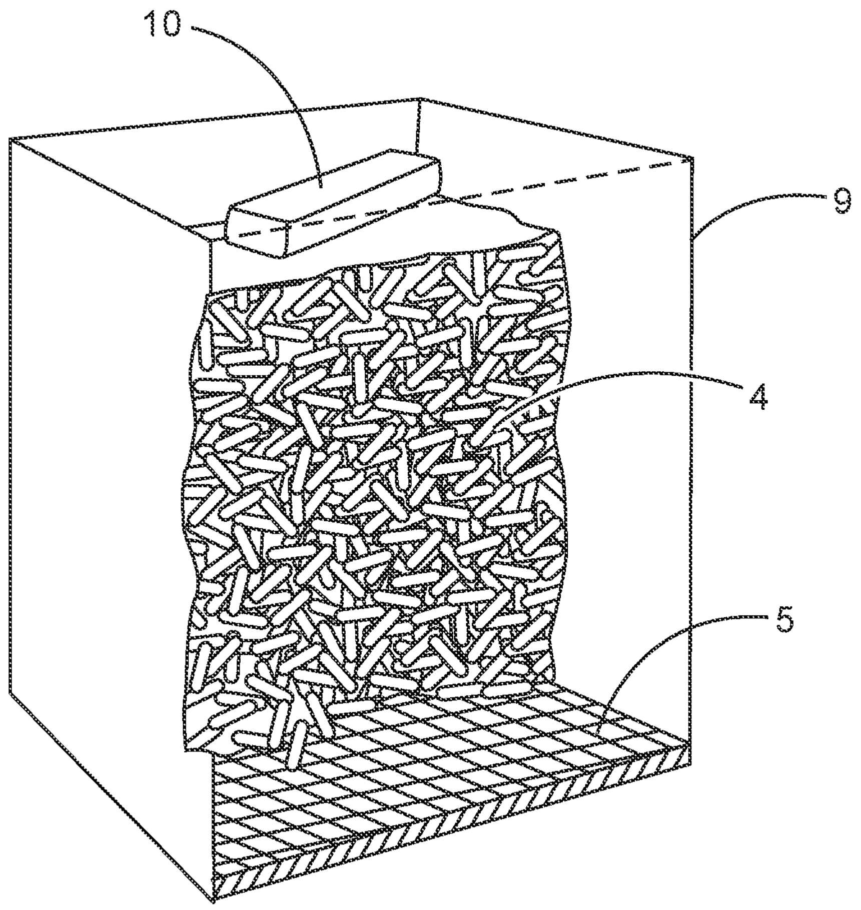
FIG. 2 depicts a cutaway view of an example prefabricated container according to aspects of the disclosure.

FIG. 2 shows a (cutaway) view of an example of a prefabricated container 9 which is insertable into the first chamber 3.

In the variant shown here, container 9, like chamber 3, has a rectangular cross-section and outer dimensions adapted to the inner dimensions of the first chamber 3, namely in such a way that the container can be introduced (inserted) into the chamber from above without difficulty.

In the example shown, intermediate layer 5 made of combustible material is placed at the bottom of container 9. This also has the advantage that container 9 keeps its outer (cuboid) shape even after it has been filled with fuel, and is therefore easily insertable into the first chamber 3.

Since the intermediate layer 5, i.e. the intermediate floor, lies on the bottom of container 9, the bottom cannot deform after filling, either, with the result, as already mentioned, that the intermediate layer, i.e. the intermediate floor, contributes to the structural stabilisation of the filled container. This makes it easier later on to insert the container into the first chamber.

The container itself is filled with the fuel, i.e. with wood pellets, wood chips, or the like, which have a predetermined size, packing density, dryness, etc.

A fire starter 10 is placed on top of the fuel 4 and can be placed there or ignited after container 1 has been inserted into chamber 3, or may already be (or already is) deposited therein as an integral part of container 9 when the latter is packed/filled with the fuel 4.

Container 9 (not shown) is preferably provided at the top with a gabled closure, i.e. the outer container material is shaped at the top to form a gable, so that, in the example shown, the closed container 9 encloses intermediate floor 5, fuel 4 and also fire starter 10.

This has the advantage that the packed, filled container receives a defined amount of fuel and also that no contamination or spillage is possible during transportation.

The walls of the container are made of combustible material, such as paper, cardboard, or the like, or may also be produced as a kind of sack made of natural fibre (jute, linen, straw, etc.).

This has the advantage that the container material is burned as well, without leaving any residue, when the fuel burns downwards.

Figure 3:
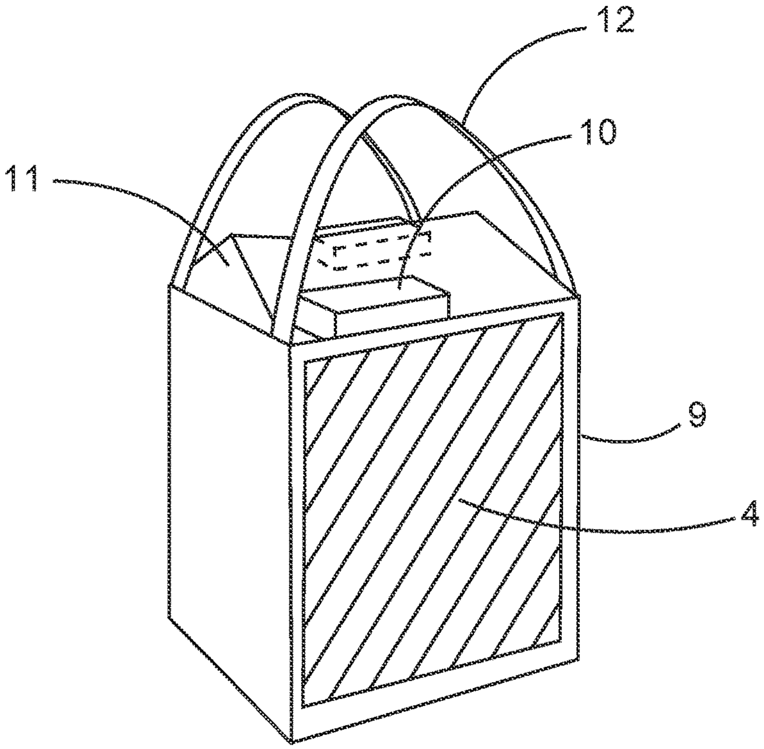
FIG. 3 depicts an example container according to aspects of the disclosure.

FIG. 3 shows the container 9 known from FIG. 2, but with an upper closure (gable) 11, and a kind of carrier handle 12, likewise made of a combustible and preferably highly flammable material, is attached at the same time to the top part of container 9, such that, when carrier handle 12 is lit with a pocket lighter, carrier handle 12 burns downwards and sets light underneath the carrier handle to lighter 10 lying in the container, thus initiating the desired combustion of the fuel.

Another advantage of the container according to the invention is that, when the container is properly stored, its contents are kept dry and thus retain their predetermined properties, in particular their combustion properties, and the user can initiate its use, at any time and as desired, and hence the burn-off and the operation of the combustion device according to the invention.

Yet another advantage of the combustion device according to the invention is that the fuel filled into it can ultimately be selected in such a way that that as little fine particulate matter as possible is produced during combustion.

It was shown in a test that the amount of fine particulate matter produced could be reduced by more than 30% (or in the best case by more than 50%), compared to the combustion of normal logs in a fireplace.

Figure 4:
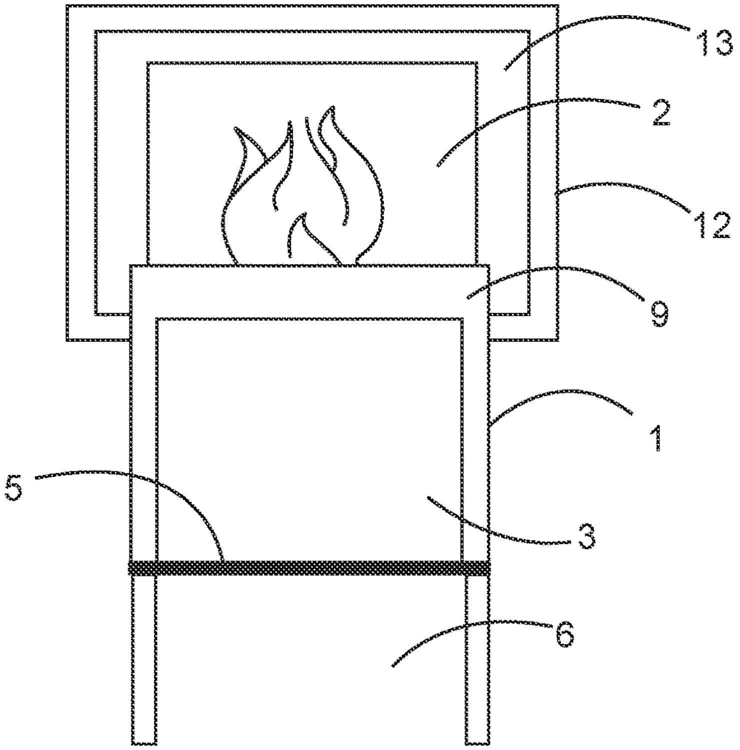
FIG. 4 depicts an example combustion device according to aspects of the disclosure.

FIG. 4 shows an example in which the combustion device 1 according to the invention is an integral part of a fireplace 12, preferably of a fireplace (or stove) 12 with a viewing window 13.

When the first chamber 3 is filled with fuel and ignited, window 13 may be closed, and a very attractive flame 2 is created which can be seen for as long as the gas combustion phase lasts, i.e. as long as the fuel is still in the first chamber 3 and the intermediate layer 5 has not yet burned through.

This variant in FIG. 4 also has the advantage that the insert (opening) through which fuel 4 is introduced can be closed at the top by a grille, a plate, or the like. The fireplace can then be loaded and fired with normal logs or normal combustible material.

In the course of time, a corresponding amount of ash is produced beside the insert, and the user can also throw/push it into chamber 3. If no intermediate layer 5 is arranged therein, this ash falls into the lower chamber 6, where it can be disposed of very easily and above all very cleanly, or if there is no time for cleaning, it can be stored temporarily without contaminating the entire room.

As already mentioned, it is also possible for the second chamber 6 to have an air supply. If this air supply is opened, i.e. air can enter the chamber from the outside, the coal therein can also be burned cleanly (coal combustion), particularly since the flue and combustion gases can then pass upwards through the second and the first chamber and be discharged in the usual manner.

The combustion device according to the invention is deployed and used not only to provide an additional source of heating, but its very attractive, bright flame means the device can also be used as a garden torch in the gas combustion phase, and also, as already mentioned, as a cooktop, stove, fireplace, etc.

When a pan is placed on the top side of the first chamber 3, food can also be prepared in the pan, cooking pot, etc. using the device according to the invention.

The charcoal that enters the second chamber can also be burned there completely in order to generate heat. To that end, this second chamber is provided with an oxygen supply via which sufficient air and hence oxygen for complete combustion (coal combustion) of the coal can enter the second chamber.

If the charcoal burning phase is not desired or is only to be kept short, care must be taken to ensure that after the charcoal has fallen from the first into the second chamber, this second chamber is sealed as airtight as possible in order to prevent any further combustion process to consumption of oxygen in the second chamber. A slide valve (not shown) which can be operated manually or by means of a motor, for example, may be provided for that purpose, which stops the supply of air from above via the first chamber, after the coal or fuel has fallen into the second chamber, i.e. a slide valve that seals off the second chamber from the first chamber.

The container according to the invention, as described above, with the fuel located therein, may, as already mentioned, be a closed container and thus form a combustion compartment that can be placed inside the first chamber.

The fuel is described as wood chips, pellets or the like. Another kind of potential fuel are wood chips, pellets, or the like which do not lie loosely in the container, but which are pressed together to form a shaped body made of wood chips, pellets, or the like.

It is also possible that the intermediate layer, i.e. the intermediate floor made of combustible material, is formed from pressed and therefore shaped wood chips, pellets, or the like.

The time that a fire needs to destroy the intermediate layer can also be set then by adjusting the thickness of the layer. This means that the duration of combustion in the gas combustion phase can also be influenced even more precisely by adjusting the thickness of the intermediate layer.

FIGS. 1 and 4 show embodiments in which intermediate layer 5 made of combustible material is firstly used to hold the fuel to be burned in the first chamber 3, and the fuel falls from the first chamber 3 into the second chamber 6 as soon as the intermediate layer is destroyed as a result of combustion.

It is also possible that intermediate layer 5 (FIGS. 5*a-d* and 6) is received by a slide-in insert 13 which is pushed from the outside into combustion device 1, namely through an opening 14 in which the slide-in insert comes up against a stop.

This variant has the advantage that intermediate layer 5 made of combustible material can firstly be put into slide-in insert 13 (FIG. 5*a*), and after the slide-in insert has been pushed into combustion device 1, the fuel can be tipped in loosely from above until the first chamber 3 has been filled to a desired filling level with fuel 4.

FIG. 5*a* shows a first view of a slide-in insert 13, which in the example shown has receptacles for two respective intermediate layers 5 that are arranged adjacent to and spaced apart from each other. The two individual intermediate layer parts 5 can be inserted separately and in the example consist of boards 2 to 4 mm thick, for example plywood boards, which are perforated, for example with number of holes each having a predetermined diameter. The holes and the number thereof serve to feed sufficient air from below into the first chamber, in order to adjust the gas combustion in the first chamber to a desired value.

If combustion in the first chamber is to be slower, an intermediate layer with fewer holes or with holes of smaller diameter can be used, whereas intermediate layers with more holes and/or larger hole diameters can be used when faster combustion is desired. The more holes and the larger the holes in the intermediate layer, the sooner the intermediate layer will also lose stability when it starts to burn directly at the top.

FIG. 5*b* shows a cross-sectional view into combustion device 1, into which the slide-in insert 13 can be inserted from the outside.

It can also be seen from FIG. 5*b* that three slopes 15 are formed in the first chamber, such that the fuel 4 located therein slides along slopes 15 onto intermediate layer parts 5.

It can also be seen from FIG. 5*b* that, after destruction of intermediate layer 5, fuel 4 then falls into a collection vessel 16 which encloses the second chamber 6. This collection vessel 16 is likewise embodied as a second slide-in insert 17, for example, so the fuel located in the second chamber can thus be removed from combustion device 1.

This second slide-in insert 14 may likewise be provided with openings 18, for example a predetermined number of holes so that the fuel 4 that has fallen into collection vessel 16 can burn there.

It has been found in experiments that, by means of the device according to the invention, charcoal or vegetable coal can be produced that meets the highest standards and is comparable to anthracite.

As a result, the vegetable coal produced by gas combustion in the first chamber and conveyed into the second chamber is also suitable and usable for soil incorporation, and can also be used as an additive in the production of animal feed, or also as barbecue charcoal.

Studies have shown that the (vegetable) coal produced by the device according to the invention can have a carbon content (like anthracite) of well over 80%, preferably also over 90% and up to 95%.

FIG. 3 shows one option for a container which can preferably be used in the combustion device according to the invention.

Another option is that the container comprises a base part 19, a roof part 20 and a side part 21, wherein the side part may also consist of four individual panels which then form the side part collectively and which are detachable from base part 19.

FIG. 7 shows an embodiment of this.

Base part 19 forms a substantially rectangular panel with a peripheral raised side edge 22, such that base part 19 forms a kind of container (tray) into which side part 21 can be placed before being filled with fuel 4, or into which the four panels can be placed if the side part consists of four panels, which then form side part 21 collectively. After filling with fuel 4, a fire starter (e.g. a Fidibus stick, a wood shavings firelighter, or the like) can be placed on or in the fuel, and the fuel pack shown in FIG. 7*a* can be closed by means of roof part (lid) 20. The assembled container 9 shown in FIG. 7*b* can also be joined or held together by a (poorly) combustible tape/fixing means so that the entire container 9 is also transportable.

When the container 9 shown in FIG. 7 is placed in the first chamber 3, the fixing means, for example tape, cord, etc., can be released so that lid 20 and side part 21, or the walls/panels of side part 21, can then be removed. The combustion process can then be started by igniting the lighter.

The advantage of the variant with the removable side part is that the entire fuel 4 is directly enclosed by the non-combustible side wall 22 of the first chamber 3. When the fuel 4 in the first chamber 3 ignites, no side part 21 made of combustible material can burn any more. If side part 21 consists of a combustible material, for example cardboard, this can result, in the worst case, to side part 21 burning down faster than the fuel 4 in the first chamber 3, which then leads to more fuel 4 than desired being ignited from the side and to the fuel burning faster than intended. So if side part 21 consists of a combustible material, this can result in it acting like a kind of "match cord" and in combustion no longer occurring only from the top down, as intended up to now, but also from the side and from the bottom, thus resulting in far more fuel material than intended burning simultaneously.

If side parts are now used which are made of a material that does not burn, for example side parts made of metal, they would not burn, but would have to be removed separately after combustion of the fuel. This is definitely possible, but awkward in certain situations, at least when the side parts are still at a very high temperature and one wants to start with the next combustion.

The fixing means by means of which the container shown in FIG. 7 is held together should also be combustible (in the case of a non-combustible fixing means, this would have to be separately removed later on), but the combustion properties of the fixing means are also allowed to be suboptimal, and it also suffices if the material merely glows because of a flame, but does not produce any combustion of its own. This is readily possible with natural materials such as sisal, flax, or the like. This then has the advantage that, after the tape material has been opened and after lid 20 has been lifted off, the fixing means may remain in place and can be burned along with the fuel during combustion in the first chamber, but without performing the "match cord function" described above.

FIG. 5*c* shows combustion device 1 with slide-in insert 13 and intermediate layer parts 5 disposed thereon, prior to insertion of the slide-in insert into the combustion device.

FIG. 5*d* shows a view into the first chamber 3 from above, and slopes 15 which open into the region in which the intermediate layer parts 5 come up against a stop after the slide-in insert has been inserted into the combustion device, so that fuel 4 loosely filled in the first chamber 3 lies on intermediate layer 5.

LIST OF REFERENCE SIGNS

1 Combustion device
2 Flames
3 First chamber
4 Combustible material/fuel

5 Intermediate layer
6 Second chamber
7 Ventilation opening
8 Support
9 Container
10 Lighter
11 Closure
12 Carrier handles
13 First slide-in insert
14 Opening
15 Slopes
16 Collection vessel
17 Second slide-in insert
18 Openings in the collecting vessel
19 Base part
20 Roof part
21 Side part
22 Side edge

The invention claimed is:

1. A combustion device for burning a fuel, wherein the combustion device comprises:

a first chamber comprising a support formed at a bottom of the first chamber and an intermediate layer held in place at the bottom of the first chamber by the support, the first chamber receiving the fuel; and a second chamber, the second chamber being arranged underneath the first chamber, wherein, the intermediate layer comprises a combustible material which holds the fuel in the first chamber until the intermediate layer is damaged or destroyed by combustion, wherein, after the intermediate layer is damaged or destroyed, fuel located in the first chamber falls into the second chamber, wherein, the combustion in the first chamber comprises gas combustion, wherein, after the fuel falls into the second chamber, the fuel is either burned or may be removed from the second chamber through an opening, and wherein, the burned fuel and the removed fuel comprises charcoal.

2. The combusion device according to claim 1, wherein the fuel comprises wood.

3. The combusion device according to claim 2, wherein the charcoal comprises one of vegetable coal and biochar.

4. The combustion device according to claim 1, wherein a support for holding the intermediate layer is formed at a bottom end of the first chamber.

5. The combustion device according to claim 1, wherein the first chamber is designed so that a container containing the fuel is insertable from above.

6. The combustion device according to claim 5, wherein the intermediate layer forms the bottom of the container which is insertable into the first chamber.

7. The combustion device according to claim 5, wherein a firelighter is arranged on a top side of the container.

8. The combustion device according to claim 7, wherein the container forms one of a sack, a bag, and a packet, each of which has the intermediate layer at the bottom of the first chamber, and above that has the fuel in a form of a wood, and above that the firelighter, wherein the container is closed at the top side.

9. The combustion device according to claim 7, wherein the top side of the container has a carrier handle which is easily combustible, wherein setting fire to the carrier handle ignites the firelighter and the fuel.

10. The combustion device according to claim 5, wherein an outer side of the container consists of one of paper, cardboard, paper strips, and a web of natural fibres.

11. The combustion device according to claim 5, wherein the container is assembled so that a predetermined combustion duration is defined, wherein the combustion duration is more than 30 minutes.

12. The combustion device according to claim 1, wherein the intermediate layer consists of one or more layers of cardboard, paper fibre, and/or wood.

13. The combustion device according to claim 1, wherein the first and/or second chambers are arranged vertically one above another and have, at least at a transition between the first and second chamber, an approximately identical cross-section which comprises a shape that is one of a circle, a square, a rectangle, and an oval, and wherein a means for holding the intermediate layer consists of one of a protrusion, an edge, pins, and bolts pointing from the outside into an interior space of the first chamber.

14. The combustion device according to claim 1, wherein the intermediate layer of combustible material is held in place by a slide-in insert, said slide-in insert being insertable into an opening of the combustion device, said opening being located between the first chamber and the second chamber.

15. A method for producing vegetable coal with a carbon content higher than 80%, wherein a fuel is fed into the combustion device according to claim 1, and the fuel conveyed into the second chamber forms a vegetable coal.

16. A container comprising a combustible material, which receives at the bottom an intermediate layer of combustible material which, in an uncombusted state, has structural stability in order to hold the fuel located above the intermediate layer, wherein the fuel comprises wood chips and/or wood pellets of a predefined size, and the container with the intermediate layer and the fuel is insertable into the combustion device according to claim 1.

17. The container according to claim 16, wherein the container comprises four side walls which are detachable from the intermediate layer and can be removed before combustion of the fuel in the combustion device.

18. The container according to claim 16, wherein the container comprises a base part, a roof part, and a side part, wherein the base part comprises the intermediate layer and has a raised peripheral side edge, the side part is detachable from the base part, and the base part, the roof part, and the side part are held together by a fixing means, and the side part, detached from the base part, is removed from the combustion device after insertion of the container into the combustion device.

19. The container of claim 18, wherein the fixing means comprises a combustible tape material.

20. The container according to claim 16, wherein an ignition means is positioned in the container above the fuel.

* * * * *